(12) United States Patent
Hamlyn et al.

(10) Patent No.: US 11,491,741 B2
(45) Date of Patent: *Nov. 8, 2022

(54) PROCESS FOR PRODUCING COMPOSITE MATERIAL PARTS BY IMPREGNATING A SPECIFIC PREFORM

(71) Applicant: CORIOLIS GROUP, Quéven (FR)

(72) Inventors: Alexander Hamlyn, Ploemeur (FR); Sophie Job, Nostang (FR)

(73) Assignee: Coriolis Group, Quéven (FR)

( * ) Notice: Subject to any disclaimer, the term of this patent is extended or adjusted under 35 U.S.C. 154(b) by 125 days.

This patent is subject to a terminal disclaimer.

(21) Appl. No.: 16/336,152

(22) PCT Filed: Sep. 22, 2017

(86) PCT No.: PCT/FR2017/000176
§ 371 (c)(1),
(2) Date: Mar. 25, 2019

(87) PCT Pub. No.: WO2018/060559
PCT Pub. Date: Apr. 5, 2018

(65) Prior Publication Data
US 2019/0224925 A1 Jul. 25, 2019

(30) Foreign Application Priority Data
Sep. 27, 2016 (FR) ...................... 16 70556

(51) Int. Cl.
*B29B 11/16* (2006.01)
*B29C 51/00* (2006.01)
(Continued)

(52) U.S. Cl.
CPC ............ *B29C 70/081* (2013.01); *B29B 11/16* (2013.01); *B29C 51/004* (2013.01);
(Continued)

(58) Field of Classification Search
CPC ......... B29B 11/12; B29B 11/16; B32B 5/022; B32B 5/06; B32B 5/12; B32B 5/26;
(Continued)

(56) References Cited

U.S. PATENT DOCUMENTS

| 494,910 A | 4/1893 | Wells |
|---|---|---|
| 1,100,829 A | 6/1914 | Joseph |

(Continued)

FOREIGN PATENT DOCUMENTS

| DE | 1 922 327 U | 8/1965 |
|---|---|---|
| DE | 37 43 485 | 7/1989 |

(Continued)

OTHER PUBLICATIONS

Lee, Chang-Lun et al. "Resin Transfer Molding (RTM) Process of a High Performance Epoxy Resin. I: Kinetic Studies of Cure Reaction". Polymer Engineering and Science, Apr. 2000, vol. 40, No. 4, pp. 929-934. (Year: 2000).*

(Continued)

*Primary Examiner* — Michael A Tolin
(74) *Attorney, Agent, or Firm* — Patterson Thuente Pedersen, P.A.

(57) ABSTRACT

A method for producing a composite material. The method includes the steps of producing an initial dry preform, formed from unidirectional continuous dry fibers, applying non-woven filaments to a first main face of the dry preform, and needling the filaments with a needling device. The needling device includes a plurality of needles, each provided with at least one notch, so that filaments are driven by the needles and arranged in a direction substantially perpendicular to the continuous fibers of the dry perform. The method includes the further step of impregnating the dry (Continued)

preform with an impregnation polymer, the impregnation polymer constituting the matrix of the composite material part.

11 Claims, 5 Drawing Sheets

(51) Int. Cl.
| | |
|---|---|
| *B29C 70/08* | (2006.01) |
| *B29C 70/24* | (2006.01) |
| *B29C 70/34* | (2006.01) |
| *B29C 70/48* | (2006.01) |
| *B32B 5/06* | (2006.01) |
| *B29C 70/38* | (2006.01) |
| *B32B 5/26* | (2006.01) |
| *D04H 18/02* | (2012.01) |
| *B29K 63/00* | (2006.01) |
| *B29K 233/20* | (2006.01) |
| *B29K 267/00* | (2006.01) |
| *B29K 307/04* | (2006.01) |

(52) U.S. Cl.
CPC ............ *B29C 70/085* (2013.01); *B29C 70/24* (2013.01); *B29C 70/345* (2013.01); *B29C 70/38* (2013.01); *B29C 70/48* (2013.01); *B32B 5/06* (2013.01); *B32B 5/26* (2013.01); *D04H 18/02* (2013.01); *B29K 2063/00* (2013.01); *B29K 2233/20* (2013.01); *B29K 2267/00* (2013.01); *B29K 2307/04* (2013.01)

(58) Field of Classification Search
CPC ....... B29C 51/004; B29C 51/02; B29C 51/14; B29C 70/081; B29C 70/083; B29C 70/085; B29C 70/086; B29C 70/12; B29C 70/14; B29C 70/16; B29C 70/20; B29C 70/202; B29C 70/205; B29C 70/207; B29C 70/22; B29C 70/222; B29C 70/226; B29C 70/228; B29C 70/24; B29C 70/345; B29C 70/36; B29C 70/38; B29C 70/443; B29C 70/48; B29K 2063/00; B29K 2105/108; B29K 2105/128; B29K 2233/20; B29K 2267/00; B29K 2307/04; D04H 1/44; D04H 1/46; D04H 1/498; D04H 3/10; D04H 3/102; D04H 3/105; D04H 18/00; D04H 18/02

See application file for complete search history.

(56) References Cited

U.S. PATENT DOCUMENTS

| | | | |
|---|---|---|---|
| 1,164,303 A | 12/1915 | Nicewarner | |
| 1,301,354 A | 4/1919 | Baird | |
| 3,206,429 A | 9/1965 | Broyles et al. | |
| 3,238,084 A | 3/1966 | Hawkins | |
| 3,265,795 A | 8/1966 | Medney | |
| 3,300,355 A | 1/1967 | Adams | |
| 3,563,122 A | 2/1971 | De Neui | |
| 3,662,821 A | 5/1972 | Saxon | |
| 3,692,601 A | 9/1972 | Goldsworthy et al. | |
| 3,713,572 A | 1/1973 | Goldsworthy et al. | |
| 3,729,785 A | 5/1973 | Sommer | |
| 3,856,052 A | 12/1974 | Feucht | |
| 4,118,814 A | 10/1978 | Holtom | |
| 4,234,374 A | 11/1980 | Frank | |
| 4,242,160 A | 12/1980 | Pinter et al. | |
| 4,259,144 A | 3/1981 | Ballentine | |
| 4,309,800 A * | 1/1982 | Foster | ........... D04H 18/02 |
| | | | 28/115 |
| 4,351,588 A | 9/1982 | Weiss et al. | |
| 4,461,669 A | 7/1984 | Dontscheff | |
| 4,488,466 A | 12/1984 | Jones | |
| 4,562,033 A | 12/1985 | Johnson et al. | |
| 4,569,716 A | 2/1986 | Pugh | |
| 4,574,029 A | 3/1986 | Murray | |
| 4,699,031 A | 10/1987 | D'Angelo et al. | |
| 4,707,212 A | 11/1987 | Hailey et al. | |
| 4,714,509 A | 12/1987 | Gruber | |
| 4,717,330 A | 1/1988 | Sarh | |
| 4,735,672 A | 4/1988 | Blad | |
| 4,849,150 A | 7/1989 | Kittaka et al. | |
| 4,881,998 A | 11/1989 | Youngkeit | |
| 4,976,012 A | 12/1990 | McConnell | |
| 4,990,213 A | 2/1991 | Brown et al. | |
| 4,992,133 A | 2/1991 | Border | |
| 4,997,513 A | 3/1991 | Lengen et al. | |
| 5,015,326 A | 5/1991 | Frank | |
| 5,078,592 A | 1/1992 | Grimshaw et al. | |
| 5,087,187 A | 2/1992 | Simkulak et al. | |
| 5,110,395 A | 5/1992 | Vaniglia | |
| 5,200,018 A | 4/1993 | Gill et al. | |
| 5,216,790 A | 6/1993 | Eschenbach | |
| 5,290,389 A | 3/1994 | Shupe et al. | |
| 5,388,320 A * | 2/1995 | Smith | ................ B29B 11/16 |
| | | | 28/107 |
| 5,397,523 A | 3/1995 | Curry | |
| 5,447,586 A | 9/1995 | Tam | |
| 5,587,041 A | 12/1996 | Sandusky et al. | |
| 5,645,677 A | 7/1997 | Cahuzac et al. | |
| 5,700,347 A | 12/1997 | McCowin | |
| 5,766,357 A | 6/1998 | Packer et al. | |
| 5,876,540 A | 3/1999 | Pannell | |
| 5,979,531 A | 11/1999 | Barr et al. | |
| 6,026,883 A | 2/2000 | Hegerhorst et al. | |
| 6,073,670 A | 6/2000 | Koury et al. | |
| 6,096,164 A | 8/2000 | Benson et al. | |
| 6,251,185 B1 | 6/2001 | Morrison et al. | |
| 6,256,889 B1 | 7/2001 | Zuro | |
| 6,451,152 B1 | 9/2002 | Holmes et al. | |
| 6,458,309 B1 | 10/2002 | Allen et al. | |
| 6,490,990 B1 | 12/2002 | Hamlyn et al. | |
| 6,540,000 B1 | 4/2003 | Darrieux et al. | |
| 6,585,842 B1 * | 7/2003 | Bompard | ............... B29C 70/202 |
| | | | 156/166 |
| 6,605,171 B1 | 8/2003 | Debalme et al. | |
| 6,808,378 B2 | 10/2004 | Wirth et al. | |
| 6,995,099 B1 * | 2/2006 | Nishimura | ............ B29C 70/083 |
| | | | 442/59 |
| 7,048,024 B2 | 5/2006 | Clark et al. | |
| 7,387,147 B2 | 6/2008 | Johnson et al. | |
| 7,509,714 B2 * | 3/2009 | Rocher | .................... B29C 70/24 |
| | | | 28/107 |
| 7,819,160 B2 | 10/2010 | Hamlyn et al. | |
| 7,926,537 B2 | 4/2011 | Hamlyn et al. | |
| 8,052,819 B2 | 11/2011 | Munaux et al. | |
| 8,057,618 B2 | 11/2011 | Hamlyn | |
| 8,191,596 B2 | 6/2012 | Hamlyn et al. | |
| 8,667,999 B2 | 3/2014 | Hamlyn et al. | |
| 8,733,417 B2 | 5/2014 | Hamlyn et al. | |
| 9,144,945 B2 | 9/2015 | Caffiau et al. | |
| 2002/0014715 A1 | 2/2002 | Wirth et al. | |
| 2002/0090408 A1 | 7/2002 | Dahl et al. | |
| 2002/0152860 A1 | 10/2002 | Machamer | |
| 2003/0118681 A1 | 6/2003 | Dahl | |
| 2004/0031879 A1 | 2/2004 | Kay et al. | |
| 2004/0079838 A1 | 4/2004 | Simpson et al. | |
| 2004/0103948 A1 | 6/2004 | Scheelen et al. | |
| 2005/0023414 A1 | 2/2005 | Braun | |
| 2005/0037195 A1 | 2/2005 | Warek | |
| 2005/0039844 A1 | 2/2005 | Engwall et al. | |
| 2005/0061422 A1 | 3/2005 | Martin | |
| 2005/0236735 A1 | 10/2005 | Oldani et al. | |
| 2005/0251978 A1 | 11/2005 | Foster | |
| 2006/0127635 A1 | 6/2006 | Colson et al. | |
| 2006/0162143 A1 | 7/2006 | Nelson et al. | |
| 2006/0169118 A1 | 8/2006 | Morehead | |
| 2006/0180264 A1 | 8/2006 | Kisch et al. | |
| 2006/0231682 A1 | 10/2006 | Sarh | |
| 2007/0044919 A1 | 3/2007 | Hoffmann | |

(56) References Cited

U.S. PATENT DOCUMENTS

| | | | |
|---|---|---|---|
| 2007/0044922 A1 | 3/2007 | Mischler et al. |
| 2008/0093026 A1 | 4/2008 | Naumann |
| 2008/0105785 A1 | 5/2008 | Griess et al. |
| 2008/0157437 A1 | 7/2008 | Nelson et al. |
| 2008/0196825 A1 | 8/2008 | Hamlyn |
| 2008/0202691 A1 | 8/2008 | Hamlyn et al. |
| 2008/0216961 A1 | 9/2008 | Hamlyn et al. |
| 2008/0216963 A1 | 9/2008 | Hamlyn et al. |
| 2009/0139654 A1 | 6/2009 | Wampler et al. |
| 2009/0229760 A1 | 9/2009 | Hamlyn et al. |
| 2009/0311506 A1 | 12/2009 | Herbeck et al. |
| 2010/0037441 A1 | 2/2010 | Lescostaouec |
| 2010/0252183 A1 | 10/2010 | Munaux et al. |
| 2011/0011537 A1 | 1/2011 | Hamlyn et al. |
| 2011/0011538 A1 | 1/2011 | Hamlyn et al. |
| 2014/0165337 A1 | 6/2014 | De Mattia |
| 2016/0059498 A1 | 3/2016 | Graf |
| 2016/0114540 A1 | 4/2016 | Hamlyn et al. |
| 2017/0268141 A1 | 9/2017 | Sheehan et al. |
| 2018/0093433 A1 | 4/2018 | Treiber et al. |
| 2018/0093446 A1 | 4/2018 | Ogale |
| 2018/0111341 A1 | 4/2018 | Leborgne |
| 2019/0077094 A1 | 3/2019 | Hamlyn et al. |
| 2019/0118410 A1 | 4/2019 | Caffiau et al. |
| 2020/0189207 A1 | 6/2020 | Hamlyn et al. |

FOREIGN PATENT DOCUMENTS

| | | |
|---|---|---|
| DE | 10 2007 009 124 A1 | 8/2008 |
| DE | 10 2012 007 43 9 A1 | 10/2013 |
| EP | 0116137 A1 | 8/1984 |
| EP | 0 216 695 A1 | 4/1987 |
| EP | 0 241 251 A1 | 10/1987 |
| EP | 0 452 186 A1 | 10/1991 |
| EP | 0 546 001 A1 | 6/1993 |
| EP | 0 555 134 A1 | 8/1993 |
| EP | 0 557 158 A1 | 8/1993 |
| EP | 0611741 A1 | 8/1994 |
| EP | 0 626 252 | 11/1994 |
| EP | 0 695 823 A2 | 2/1996 |
| EP | 0 697 990 | 2/1996 |
| EP | 0 753 394 A2 | 1/1997 |
| EP | 0 773 099 A1 | 5/1997 |
| EP | 1 001 066 A2 | 5/2000 |
| EP | 1 177 871 A2 | 2/2002 |
| EP | 1 342 555 A1 | 9/2003 |
| EP | 1 757 552 A2 | 2/2007 |
| ER | 2 624 786 A1 | 6/1989 |
| FR | 1 590 718 | 5/1970 |
| FR | 2 050 498 | 4/1971 |
| FR | 2 254 428 | 7/1975 |
| FR | 2 686 080 A1 | 7/1993 |
| FR | 2 721 548 | 12/1995 |
| FR | 2 784 930 A1 | 4/2000 |
| FR | 3 006 938 A1 | 12/2004 |
| FR | 2 865 156 | 7/2005 |
| FR | 2 882 681 A1 | 9/2006 |
| FR | 2912953 A1 | 8/2008 |
| FR | 2 913 365 A1 | 9/2008 |
| FR | 2 948 058 A1 | 1/2011 |
| FR | 2 982 793 A1 | 5/2013 |
| FR | 2 999 973 | 6/2014 |
| FR | 3 016 827 A1 | 7/2015 |
| FR | 3048373 A1 | 9/2017 |
| FR | 3056438 A1 | 3/2018 |
| FR | 3064523 A1 | 10/2018 |
| FR | 3064524 A1 | 10/2018 |
| GB | 2 268 705 A | 1/1994 |
| GB | 2 270 672 A | 3/1994 |
| GB | 2 292 365 A | 2/1996 |
| JP | 01 281247 | 11/1989 |
| JP | 2005-007252 | 1/2005 |
| JP | 2005329593 | 12/2005 |
| WO | WO 88/10154 A1 | 12/1988 |
| WO | WO 92/04492 A1 | 3/1992 |
| WO | WO 95/20104 | 7/1995 |
| WO | WO 02/070232 | 9/2002 |
| WO | WO 03/035380 A1 | 5/2003 |
| WO | WO-2004041528 A2 | 5/2004 |
| WO | WO 2006/060270 A1 | 6/2006 |
| WO | WO-2006069581 A1 | 7/2006 |
| WO | WO 2006/092514 A2 | 9/2006 |
| WO | WO 2008/122709 A1 | 10/2008 |
| WO | WO 2008/132299 A2 | 11/2008 |
| WO | WO 2008/149004 A1 | 12/2008 |
| WO | WO 2009/181805 A1 | 7/2009 |
| WO | WO 2010/049424 A1 | 5/2010 |
| WO | WO 2012/160270 A1 | 11/2012 |
| WO | WO 2013/03 0467 A1 | 3/2013 |
| WO | WO 2013/072583 A2 | 5/2013 |
| WO | WO 2014/202845 A1 | 12/2014 |
| WO | WO 2015/018801 A1 | 2/2015 |

OTHER PUBLICATIONS

Application and File history for U.S. Appl. No. 16/644,097, filed Mar. 3, 2020. Inventors: Hamlyn et al.

Search Report with English translation for PCT Application No. PCT/FR2014/000135, dated Oct. 8, 2014, 4 pages.

Search Report for PCT Application No. PCT/FR2009/064156, dated Feb. 1, 2010, 2 pages.

Search Report for French Application No. 1154449, dated Jan. 10, 2012, 2 pages.

Search Report for PCT Application No. PCT/FR2012/000195, dated Oct. 24, 2012, 2 pages.

Search Report for PCT Application No. PCT/FR2016/000165, dated Jan. 25, 2017, 4 pages.

English translation of Search Report for PCT Application No. PCT/FR2016/000165, dated Jan. 25, 2017, 2 pages.

Written Opinion for PCT Application No. PCT/FR2016/000165, dated Jan. 25, 2017, 6 pages.

English translation of Written Opinion for PCT Application No. PCT/FR2016/000165, dated Jan. 25, 2017, 6 pages.

Search Report for PCT Application No. PCT/FR2017/000043, dated Jun. 26, 2016, 5 pages.

English translation of Search Report for PCT Application No. PCT/FR2017/000043, dated Jun. 26, 2016, 3 pages.

Written Opinion for PCT Application No. PCT/FR2017/000043, dated Jun. 26, 2016, 5 pages.

Written Opinion for PCT Application No. PCT/FR2016/000043, dated Jul. 19, 2016, 12 pages.

Search Report for PCT/FR2016/000043, dated Jul. 19, 2016, 7 pages.

Written Opinion for PCT Application No. PCT/FR2016/000043, dated Sep. 28, 2017, 8 pages.

Search Report dated Jul. 2, 2010 for PCT Application No. PCT/EP2010/054377, 12 pages.

French Search Report dated Apr. 13, 2010 for French Application No. 0954963, 7 pages.

French Search Report dated Apr. 15, 2010 for French Application No. 0954964, 8 pages.

Evans, Don O., et al. "Fiber Placement Process Study," SAMPE 34.sup.th Symposium Book of Proceedings, May 8-11, 1989, pp. 1-12.

Search Report with English translation for PCT Application No. PCT/FR2016/000057, dated Jun. 20, 2016, 4 pages.

Written Opinion for PCT Application No. PCT/FR2016/000057, dated Oct. 12, 2017, 8 pages.

PCT International Search Report for PCT/FR2017/000176, dated Jan. 16, 2018, 4 pgs.

English translation PCT International Search Report for PCT/FR2017/000176, dated Jan. 16, 2018, 3 pgs.

International Preliminary Reporton Patentability for Application No. PCT/FR2018/000205, dated Mar. 19, 2020, 16 pages (with English Translation).

International Preliminary Reporton Patentabilityfor Application No. PCT/FR2017/000176, dated Apr. 11, 2019, 12 pages (with English Translation).

(56) References Cited

OTHER PUBLICATIONS

International Search Report for Application No. PCT/FR2018/000205, dated Dec. 11, 2018, 3 pages (With English translation).

* cited by examiner

PROCESS FOR PRODUCING COMPOSITE MATERIAL PARTS BY IMPREGNATING A SPECIFIC PREFORM

RELATED CASES

The present application is a National Phase entry of PCT Application No. PCT/FR2017/000176, filed Sep. 22, 2017, which claims priority from FR Patent Application No. 16 70556, filed Sep. 27, 2016, which applications are hereby incorporated by reference in their entireties.

TECHNICAL FIELD

The present invention relates to a method for producing parts made of organic matrix composite material, also called polymer composite matrix material, comprising continuous unidirectional fibers and a polymer matrix.

BACKGROUND ART

There are known methods of producing a part of polymer matrix composite material, comprising a step of producing an initial dry preform, and a step of impregnating the dry preform with an impregnation polymer, for example by injection and/or infusion, to form a composite material part, the impregnation polymer constituting the polymer matrix of the composite material part.

The dry preforms are conventionally made manually from fabrics formed by weaving continuous unidirectional dry fibers, or from multiaxial fabrics or NCF (Non Crimp Fabric) fabrics comprising several superimposed plies of continuous unidirectional fibers held together by stitching. These preforms have a high manufacturing cost, and the wastage rates during the production of parts from such prefabricated fabrics are significant.

In order to automate the operation and to limit the wastage rate, it has been proposed to produce dry preforms by automatic lay up of continuous unidirectional fibers, the resulting preforms comprising several superimposed plies of continuous unidirectional fibers. The fibers can for example be applied contact application, by means of a roller, by a fiber placement process, each ply being formed by laying up on a mold of one or more joined bands, each formed of one or more flat fibers, ribbon type, such as carbon fibers consisting of a multitude of carbon threads or filaments. The dry preforms comprise a small amount of binder, generally less than 5%, to maintain the cohesion of the preform. However, this type of preform obtained by laying up superimposed plies may have insufficient permeability and cohesion between fibers to allow rapid and satisfactory impregnation, especially in the case of impregnation by RTM (Resin Transfer Molding) injection at high pressure and high temperature.

SUMMARY OF THE INVENTION

The purpose of embodiments of the present invention is to provide a method of manufacturing composite material parts that overcomes at least one of the aforementioned drawbacks.

To this end, the object of embodiments of the present invention is a process for producing a polymer matrix composite material part comprising a step of producing an initial dry preform, formed from continuous unidirectional dry fibers, preferably comprising a plurality of superposed plies, each formed from continuous unidirectional dry fibers, and a step of impregnating the dry preform with a first impregnation polymer, for example by injection and/or infusion, to form a part made of composite material, the impregnation polymer constituting the matrix of the composite material part, characterized in that it further comprises a step of applying non-woven fibers or filaments to a first main face of the dry preform, and a needling step of the filaments by means of a needling device comprising a plurality of needles, each equipped with at least one notch, so that the filaments are driven by the needles and arranged in a direction substantially perpendicular to the continuous fibers of the dry preform, the reinforced dry preform obtained after the needling step being subjected to the impregnation step.

The needles are driven in a back and forth motion by a driving system of the needling device, to cross the preform, preferably from one side to the other. During the movement of the needles in the direction of the preform, at least a portion of these filaments are positioned in the notches of the needles and are driven by the needles through the preform. These needled filaments positioned in the Z direction, in the thickness of the preform, stabilize the dry preform and make it possible to increase the cohesion of the dry preform for the subsequent impregnation step, and thus to avoid delamination of the preform during impregnation, especially in the case of injection of impregnation polymer. In addition, the perforations created by the needles and needled filaments positioned in Z increase the permeability in Z of the dry preform, in the thickness of the preform.

The impregnation is thus facilitated and can be carried out at high rates, without dry areas, and without deterioration of the preform. At the end of the impregnation step, the composite material part preferably comprises at least 30% by weight of impregnation polymer, and/or preferably at least 35% by volume of impregnation polymer, the impregnation polymer constituting the matrix of the composite material part.

Preferably, the composite material part according to the invention comprises at least 40% by volume of continuous unidirectional fibers, preferably at least 50% by volume, more preferably at least 55% by volume of continuous unidirectional fibers.

During the needling, the notches of the needles are filled by the filaments so that the unidirectional fibers are not or only slightly driven or damaged by the needles. In the case of preforms having continuous fibers with a principal orientation, the needles are arranged so that their notches cannot carry the continuous fibers of the preform, the notches being preferably arranged at 90° of the principal orientation of the fibers.

The continuous unidirectional fibers, preferably applied by fiber placement, are for example carbon fibers, glass fibers, synthetic fibers such as aramid fibers, polyethylene fibers, and/or natural fibers, as such for example flax fibers.

The method according to embodiments of the invention may be advantageously used for the production of composite material parts, particularly in the automotive or aeronautics sector.

According to one embodiment, the nonwoven filaments applied during the application step are formed from at least one second polymer, the impregnation step being carried out at a temperature below the melting temperature, and preferably greater than the glass transition temperature of the second polymer, so that the filaments ensure good holding of the fibers of the preform during the impregnation step, in particular its mechanical resistance to delamination.

The needling density is defined in particular according to the desired permeability and stabilization, and the type of needle used. According to one embodiment, the needling density during the needling step is between 10 and 350 punches/cm$^2$. In the case of a needling device equipped with forked needles, the needling density is preferably from 150 to 350 punches/cm$^2$, more preferably from 200 to 300 punches/cm$^2$. In the case of a needling device provided with barbed needles, each comprising a plurality of notches, the needling density is preferably from 10 to 100 punches/cm$^2$, more preferably from 40 to 60 punches/cm$^2$.

The working part of the needles preferably has a diameter of between 0.30 and 0.60 mm, preferably between 0.40 and 0.50 mm (gauges 38 to 42).

The width and/or depth of the notches, preferably the width and the depth of the notches, are between 0.03 and 0.1 mm, preferably between 0.04 and 0.06 mm.

The length of the filaments is defined according to the thickness of the dry preform, preferably in such a way that the needled filaments pass through the preform. Furthermore, the needled filaments should preferably be long enough to remain entangled on the first face of the preform, and thus ensure better stability of the preform.

According to one embodiment, the filaments applied on the preform have a length of between 10 and 100 mm, preferably between 40 and 60 mm, and a diameter of between 5 and 50 μm, preferably 10 to 35 μm.

According to one embodiment, the needling is carried out so that filaments transferred by the needles protrude from the second main face of the preform which is opposite to the first main face on which the filaments have been applied, over a length between 1 and 10 mm, preferably 2 to 6 mm, some of these filaments being able to form loops protruding from the second face of the preform.

According to another embodiment, particularly in the case of a preform of large thickness, the method according to the invention comprises a step of applying nonwoven filaments to the second main face of the dry preform, and a step of needling the filaments present on the second main face. Preferably, the needling of the filaments present on the second main face and the needling of the filaments present on the first main face are made simultaneously.

According to one embodiment, the needling is performed by means of forked needles, preferably with a needle penetration depth of between 1 and 10 mm, preferably between 2 and 6 mm. The use of forked needles makes it possible to obtain an efficient needling of the filaments without deterioration of the fibers of the preform.

According to one embodiment, the step of filament application comprises the application of a nonwoven veil or felt formed of the filaments. The felts used may be isotropic, with randomly oriented filaments, or oriented felts with filaments having a preferred orientation. In the case of oriented felts, the needles, and more particularly their notches, are arranged according to the orientation of the filaments so as to optimize the take up rate of filaments by the needles. In the case of preforms having continuous fibers with a principal orientation, the oriented felt is advantageously applied to the preform so that the filaments form a non-zero angle with the continuous fibers of the principal orientation of the preform, for example an angle of 90°.

According to one embodiment, the felt has a surface mass of 5 to 100 g/m$^2$, and/or the preform provided with filaments comprises from 1 to 10% by weight of filament, preferably from 2 to 5% by weight of filament.

One part of the filaments of the felt is transferred through the preform, the non-transferred filaments present on the first main face may be removed by peeling the felt or not.

According to one embodiment, the remainder of the felt is held on the preform for the impregnation step, the nonwoven structure of the felts increases the permeability of the preform and thus makes it possible to promote the infusion and/or injection, the felts conferring a draining effect, more particularly in the case of an infusion. Felt may further increase the impact strength of the preform and/or improve the surface appearance of the preform.

The impregnation step may for example be carried out according to a wet impregnation process, a vacuum infusion process, an LCM process, an RTM, HP-RTM, Gap-RTM or VARTM process. According to one embodiment, the impregnation step consists of a step of injecting the dry preform placed in an injection mold, the injection being carried out at a pressure of at least 10 bars, for example in the order of 50 bars.

Preferably, the method comprises producing a nonwoven preform. According to one embodiment, the method comprises the production of an initial dry preform, comprising several superimposed plies, the plies being formed from continuous unidirectional dry fibers provided with a binder, the binder comprising a third polymer, the impregnation step then preferably being carried out at a temperature higher than the glass transition temperature, and preferably below the melting temperature of the third polymer forming the binder. The dry preforms are obtained by application of dry fibers provided with a binder and/or by application of dry fibers without a binder, and application of the binder, for example by spraying a liquid binder and/or spraying a binder in the form of powder, on the application surface and/or dry fibers previously laid. The dry preform comprises less than 10% by weight of binder, preferably less than 5% by weight of binder.

The second and third polymers may be different or identical or of the same family.

According to one embodiment, the third polymer forming the binder and/or the second polymer forming the filaments is a thermoplastic polymer, preferably chosen from the group consisting of polyamides, especially aromatic polyamides (aramids), polyesters such as polyethylene terephthalate, polyethersulfones, polyetheretherketones, phenylene polysulfides, polyurethanes, epoxides, polyolefins, polylactic acid, polyacrylics, and mixtures thereof. In the case of a thermosetting polymer, the third thermosetting polymer and/or the second thermosetting polymer are for example selected from the group consisting of epoxides, polyesters, vinyl esters, phenolics, polyimides, bismaleimides, and mixtures thereof. According to other embodiments, the filaments applied to the preform are filaments of glass, carbon, or metal.

According to one embodiment, the dry preform is obtained by a fiber placement method, known per se. According to one embodiment, the production of the dry preform comprises the production of superimposed plies, by contact application, by means of an application roller, of continuous unidirectional fibers on a laying up tool, each ply being produced by application of one or more bands in one direction on the laying up tool or on bands of the previous ply, each band being formed of one or more fibers.

The fiber placement is advantageously automated by means of a fiber placement head, known per se, comprising a compacting roller intended to come into contact against the tool to apply a band formed of one or more continuous flat fibers, and a guiding system for guiding one or more fibers on the roller, by relative movement of the application head relative to the laying up surface along different trajectories. The preform comprises for example from 2 to 100 superimposed plies.

The continuous unidirectional fibers are preferably in the form of flat continuous unidirectional fibers, conventionally called tows, comprising a multitude of filaments. The fibers have for example widths of one-eighth of an inch, one-quarter inch or one-half inch (⅛", ¼" or ½"). As used herein, the term «fibers» also refers to fibers of greater width, greater than ½ inch, conventionally called tape in placement technology.

Alternatively, the fibers can be fixed to the mold, for example mechanically or by gluing, only at the beginning and at the end of the trajectory, the roller preferably being in contact at the beginning and at the end of the trajectory, and possibly at a distance from the surface on the rest of the trajectory.

According to another embodiment, the needling according to the invention is used as a replacement for the stitching operation performed during the manufacture of a multiaxial fabric NCF, the dry preform then comprises several superposed plies, without a binder, the needling of the filaments applied to the first main face of the preform is produced by mechanically holding the fibers of the plies of the preform, for example by a pin system around which the fibers pass.

According to one embodiment, the method comprises a step of thermoforming the reinforced dry preform obtained after the needling step, preferably between the male forming tool and the female forming tool of a press, to obtain a three-dimensional preform, the thermoforming being performed at a thermoforming temperature lower than the melting temperature of the second polymer, and preferably greater than the glass transition temperature of the second polymer, the three-dimensional preform obtained after thermoforming being subjected to the impregnation step. Alternatively, the forming is performed by means of a vacuum cover, after positioning the preform on a forming tool.

In the absence of needling, the deformation of the preform during forming is performed fiber by fiber. The needling operation of the preform according to the invention prior to the forming operation makes it possible to obtain a homogeneous deformation of the preform, due to the sliding of the needled filaments.

Furthermore, the filaments of the felt present on each main face of the preform allow the preform to slide in the press without adhesion. The outer filaments stabilize the outer surfaces of the preform by limiting, or even eliminating, local deformations of the preform and thus ensure a homogeneous deformation of the fibers of the preform. The method according to the invention thus makes it possible to promote the sliding mechanisms between the forming tools and the preform, and thus to limit, or even eliminate, the fiber defects of the outer plies of the preforms resulting from the friction between the preform and the forming tools in previous forming processes.

The forming is preferably carried out at a forming temperature lower than the melting temperature of the third polymer forming the binder, and preferably greater than the glass transition temperature of said third polymer. The forming is carried out with heat, the initial preform being heated to a forming temperature before and/or during forming in order to increase the formability of the preform. The initial preform may be preheated prior to forming by passing through an oven or tunnel and/or the preform may be heated during forming by heating the male forming tool and/or the female forming tool. Preferably, the preform is only preheated by passage in an oven or tunnel, the tools of the press not being heated, thus simplifying the tools of the press.

The initial preform can be two-dimensional, obtained by laying up on the flat surface of a tool, or three-dimensional, the forming can then be carried out to obtain three-dimensional parts of a complex form that cannot be obtained by laying up, particularly by fiber placement.

BRIEF DESCRIPTION OF THE DRAWINGS

The invention will be better understood, and other objectives, details, characteristics and advantages will appear more clearly in the following detailed explanatory description of a currently preferred embodiment of the invention, with reference to the schematic drawings annexed thereto, in which.

DETAILED DESCRIPTION

Figure 1:
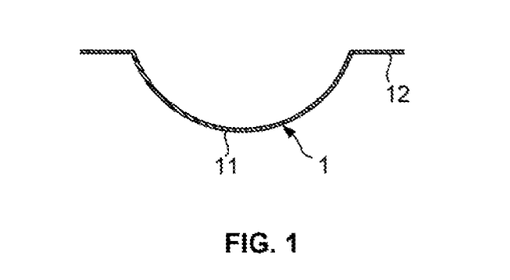
FIG. 1 is a schematic sectional view of an example of a three-dimensional composite material part made according to the method according to the invention.

FIG. 1 illustrates an example of a three-dimensional plastic material part 1 that can be produced according to a method of the invention, comprising the laying up of continuous fibers to form a flat dry preform, the application of a felt of non-woven fibers to the preform and needling of said felt, the forming of the preform then its impregnation. The part presented here has the shape of a spherical cap 11 with an annular rim 12.

Figure 2:
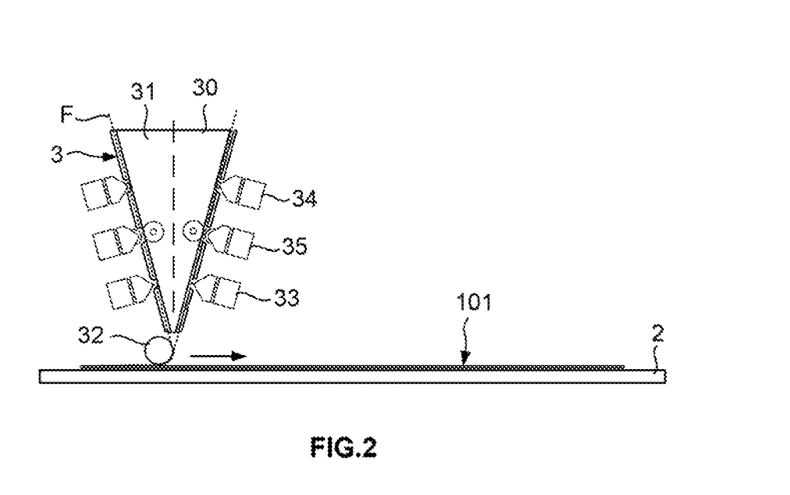
FIG. 2 is a schematic side view illustrating the laying up operation of the initial dry preform.

In a first step, such as illustrated in FIG. 2, continuous unidirectional fiber plies are laid up flat on a lay-up tool 2 in different orientations, to form an initial two-dimensional dry panel or preform 101 presenting two main opposing faces 111, 112.

The laying up is carried out by means of a laying up device 3 comprising a fiber placement head 30, known per se, allowing automatic contact laying up with bands formed of one or more fibers. The fibers F enter the head 3 in the form of two layers of fibers, and the head comprises a guiding system 31 for guiding the fibers to the compacting roller 32 in the form of a band of fibers in which the fibers are arranged side by side, for example substantially edge to edge. The head comprises, on either side of the guiding system, cutting means 33 for individually cutting each fiber passing through the guiding system, blocking means 34 for blocking each fiber that has just been cut, and feeding means 35 to individually feed each fiber, in order to be able to stop and resume the application of a fiber at any time, as well as to choose the width of the band. The laying up of a band is achieved by relative movement of the head in relation to the substantially planar layup surface of the draping tool. The head comprises for example a support structure (not shown) on which is mounted the guiding system and by which the head can be assembled to a displacement system, adapted to move the head in at least two directions perpendicular to each other. The head is for example designed to receive eight fibers, and allow the application of bands of 1 to 8 fibers of 6.35 mm (¼ inch) wide.

The head is used for the production of a dry preform, from dry fibers provided with a binder, to give a tackiness to the fibers during the laying up and ensure the cohesion of the preform. The binder, consisting of a polymer, may be applied to the fibers prior to laying up, for example in the form of a veil and/or powder, bobbins of fibers pre-provided with the binder being loaded into the fiber placement machine. The binder may be applied on line, during the laying up of the fibers, for example directly on the fibers to be laid, for example in the form of filaments, as described in the French patent application No. 16 70088, filed Mar. 7, 2016 and entitled "Process for producing preforms with application of binder on dry fiber, and corresponding machine".

In the particular case of fibers pre-provided with binder, the head 3 is preferably equipped with a heating system (not shown), for example of the IR lamp or laser type, in order to heat the binder during the application of the fibers, and thus allow at least an adhesion of the fibers of the different plies. The heating system heats the fibers before they are applied to the application surface, as well as the application surface or the fibers previously laid, upstream of the roller relative to the direction of the advancement of the head.

The fibers are, for example, continuous flat carbon fibers, of the tows type, comprising a multitude of threads or carbon filaments, with a thermoplastic binder present in an amount of about 2% by weight.

Figure 3:
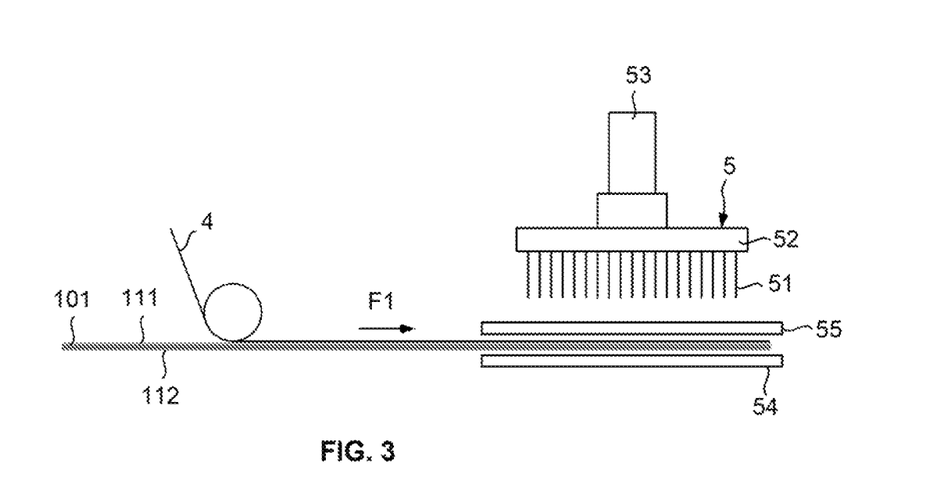
FIG. 3 is a schematic side view illustrating the operation of needling of a nonwoven fiber felt applied on the preform.

After producing the dry preform 101, a felt 4 of nonwoven filaments or fibers 40 is applied to a first main face 111 of the dry preform, and the preform thus equipped with the felt is subjected to a needling operation, such as diagrammatically illustrated in FIG. 3, by passing through a needling device or needler 5.

Figure 4:
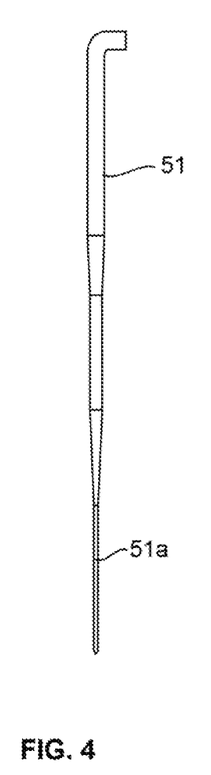
FIG. 4 is a schematic view of a barbed needle that can be used in the needling device.
Figure 5:
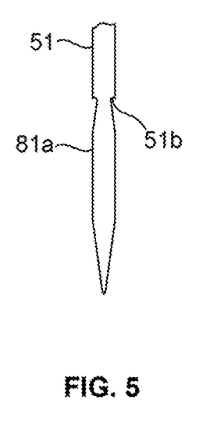
FIG. 5 is a partial enlarged view of FIG. 4.
Figure 6:
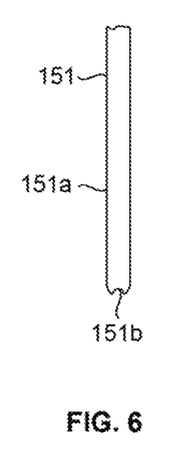
FIG. 6 is a similar view to that of FIG. 5 illustrating a forked needle that can be used in the needling device.

The needling device 5, known per se for consolidating mats of fibers, comprises a plurality of needles 51 mounted on a support 52 or needle board, able to be driven, by appropriate means 53, with a back and forth movement in a direction parallel to the needles. The needling device comprises a perforated support table 54 arranged facing the needles and intended to support the preform, and a stripper plate or stripper device 55 placed between the support table and the needles, provided with through holes for the passage of the needles. The support table also includes a set of holes to allow for the passage of the needles after they have passed through the preform. The needling device is for example equipped with so-called barbed needles 51, such as illustrated in FIGS. 4 and 5, comprising along its distal portion or working portion 51a one or more notches 51b, oriented towards the end of the needle, so that the needle drives the filaments only during the penetration phase, from top to bottom in FIG. 3. Alternatively, the needling device is equipped with so-called forked needles 151, such as shown in FIG. 6, comprising one or more notches 151b at the end of its working portion 151a.

Figure 7:
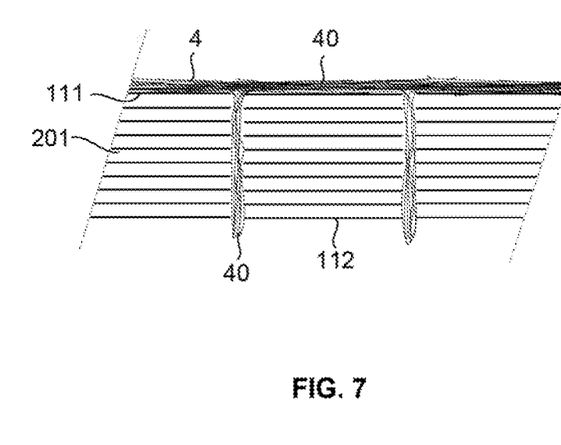
FIG. 7 is a schematic partial sectional view of the preform after needling.

During needling, the preform is driven positively in the direction of the arrow referenced F1, and the needles are driven back and forth. When moving the needles downwards, fibers of the felt are positioned in the notches 51b of the needles and are driven through the entire thickness of the preform, the filaments emerging on the second main face 112, such as schematically illustrated in FIG. 7. The needling density is defined according to the frequency of the back and forth movement of the needles, the number of needles, and the advancement speed of the preform in the needling device.

After needling, the remainder of the felt formed by the filaments on the first face which have not been needled, may be held on the preform or removed. According to one embodiment, the needling density and the penetration depth of the needles, which is equal to the distance between the end of the needle and the second main face of the preform, are defined so that the preform presents a quantity of filaments, preferably similar, on each of its faces, these filaments on the surface increase the permeability of the preform, and also facilitate the forming operation.

According to an alternative embodiment, the filaments are not applied in the form of a felt, but projected in a random manner on the first face of the preform.

Figure 8:
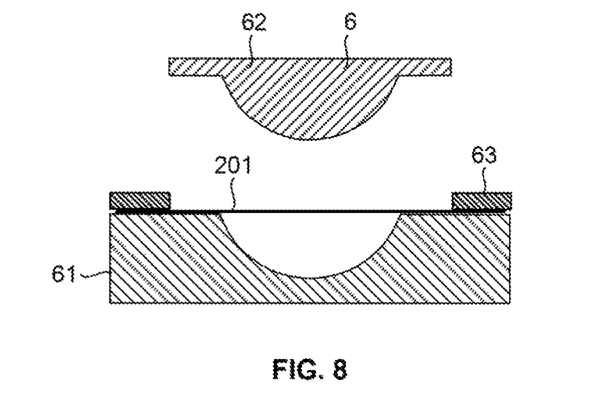
FIGS. 8 and 9 are sectional views of the press illustrating the forming operation of the preform obtained after needling.
Figure 9:
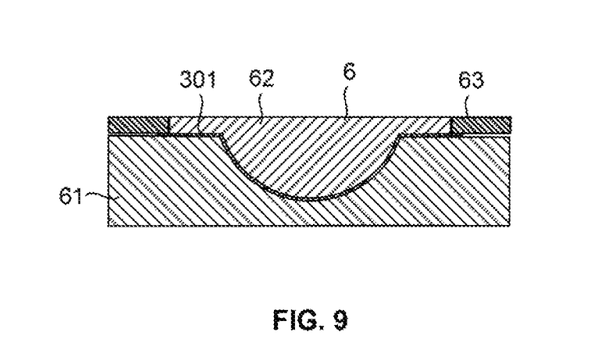

The preform provided with needled filaments, called reinforced preform 201, is then transferred to a press for the forming operation, also called a stamping operation. Such as illustrated in FIG. 8, the press 6 comprises a female forming tool 61 or matrix, having a recess whose shape corresponds to that of the spherical cap 12 of the preform to be produced, and a male forming tool 62, or punch, comprising a boss of complementary shape. The forming is performed by bringing closer together the male forming tool and the female forming tool, from an open position of the press illustrated in FIG. 4 towards a closed position of the press illustrated in FIG. 5.

The forming is carried with heat, the preform being at a forming temperature between the glass transition temperature and the melting temperature of the polymer constituting the binder, and between the glass transition temperature and the melting temperature of the polymer forming the filaments of the felt. This forming temperature of the preform is obtained by preheating the preform before positioning in the press and/or by heating the two tools 61, 62. This preheating is for example carried out by passing the initial preform between the upper and lower ramps of the infrared lamps of an oven or preheating tunnel. Preferably, during forming, the preform is kept under tension by a tensioning system, for example of the blank holder type, such as shown schematically under the reference 63. The tools 61, 62 are then spaced one from another in the open position to demold the reinforced three-dimensional preform 301 from the press.

Figure 10:
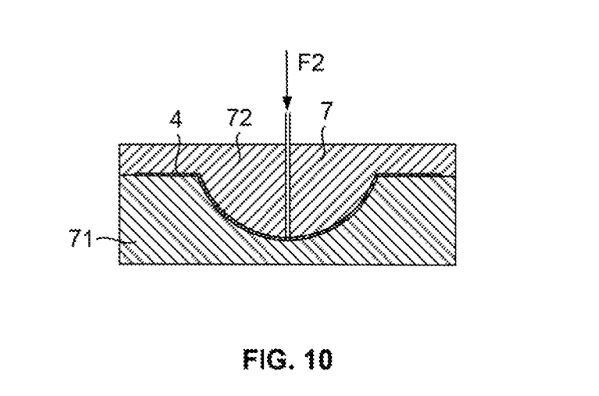
FIG. 10 is a schematic sectional view of the injection mold illustrating the injection operation of the preform obtained after thermoforming.

The resulting three-dimensional reinforced preform 301 is then subjected to an operation of adding or impregnating of a thermosetting or thermoplastic impregnation polymer, by an injection and/or infusion process. With reference to FIG. 10, the three-dimensional reinforced preform is for example placed in an injection mold 7, between the male part and the female part of said mold, an impregnation polymer is injected under pressure into the preform, according to a RTM (Resin Transfer Molding) or Gap-RTM method, such as schematically illustrated by the arrow referenced F2. The composite part 1 obtained at the end of this impregnation step may be subjected to a trimming operation.

For example, the following parts have been made.

Example 1

Laying up: Laying up of a preform by placement of carbon fibers provided with a binder applied on line, formed of a thermoplastic copolyester having a melting point of about 130° C., and a glass transition temperature of approximately 15° C., the preform being made by laying up eight plies of fibers in different orientations, according to the following laminate sequence: +45°/−45°/0°/90°/90°/0°/−45°/+45°.

Application: Application of a non-woven felt made of filaments or polyester fibers 14 μm in diameter, 40 to 60 mm in length, and a melting point of about 200° C., the felt, having an isotropic orientation, having a surface mass of 50 g/m².

Needling with barbed needles, gauge 40 (0.45 mm), having a working portion of triangular section, with two notches or barbs per edge, with a needling density of 50 strokes/cm². The remaining felt is held on the preform.

Forming: forming at a forming temperature of 120° C.

Injection: gap-RTM type injection of a thermosetting epoxy polymer in a three-minute cycle with a first compression phase and heating to 120° C. for about 2 minutes, and a second injection and polymerization phase at 50 bars, put under vacuum, for about 1 minute.

Example 2: The Steps of Laying Up, Forming and Injection are Identical to Those of Example 1

Application: Application of a non-woven felt of pre-oxidized polyacrylonitrile fiber 30 μm in diameter, of 40 to 60 mm in length, a melting point greater than 200° C., having a surface mass of 60 g/m², the fibers having a substantially isotropic orientation.

Needling with forked needles, having a working portion of gauge 42 (0.40 mm), having a notch or fork at the end, of 0.05 mm deep and 0.05 mm wide, with a needling density of 200 punches/cm² and a penetration depth of 5 mm. The remaining felt is held on the preform.

The two resulting pieces have been injected uniformly, without displacement of fibers and without dry areas.

Figure 11:
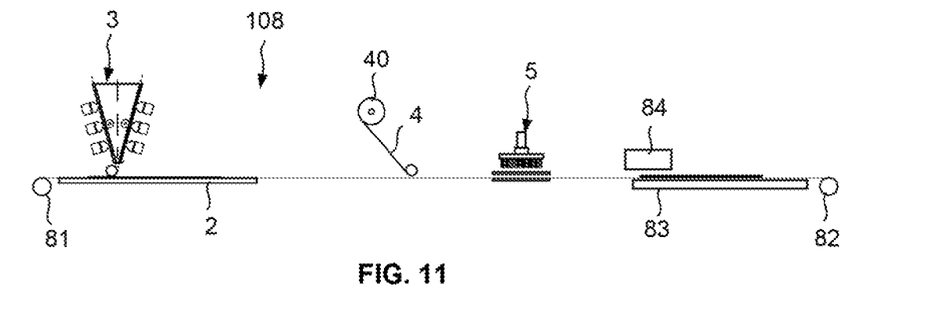
FIG. 11 is a schematic side view of a laying up and needling system according to a first embodiment.

FIG. 11 illustrates a system 108 of laying up and needling according to the invention in which the transfer of the preform from the laying up device 3 to the needling device 5, as well as the advance of the preform during needling, are carried out by means of a support film 80. A support film is unwound from an upstream roller 81 passing on the laying up plate 2, between the support table and the stripper plate of the needling device, then on a cutting plate 83, and is re-wound on a downstream roller 82. The preform is first laid over the support film and then transferred to the needling device by winding the film on the downstream roller. During this transfer, the felt 4 is unwound automatically from a bobbin 40 to be applied to the upper face of the preform. The felt is then needled, the film being wound on the downstream roller to progressively advance the preform in the needling device. The reinforced preform is then fed to the cutting plate 83, for cutting, for example by an ultrasound cutting system 84, the film around the preform. The support film can then be removed from the preform or held thereon for the subsequent impregnation phase, with a possible intermediate forming step. The laying up preferably takes place with the support film in the stationary state. The cutting of the film of a preform can for example be performed simultaneously with the laying up of a new preform.

Figure 12:
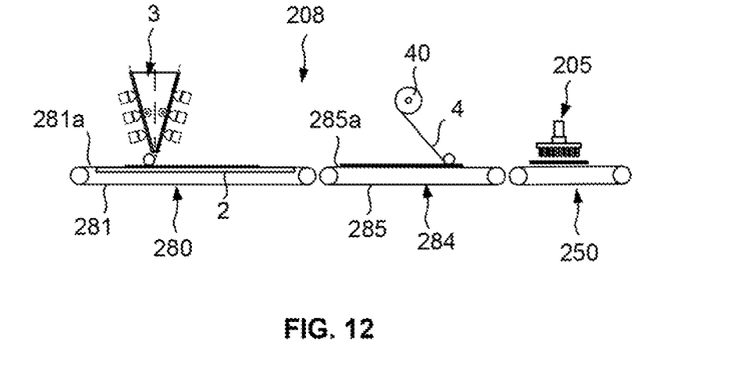
FIG. 12 is a schematic side view of a laying up and needling system according to a second embodiment.
Figure 13:
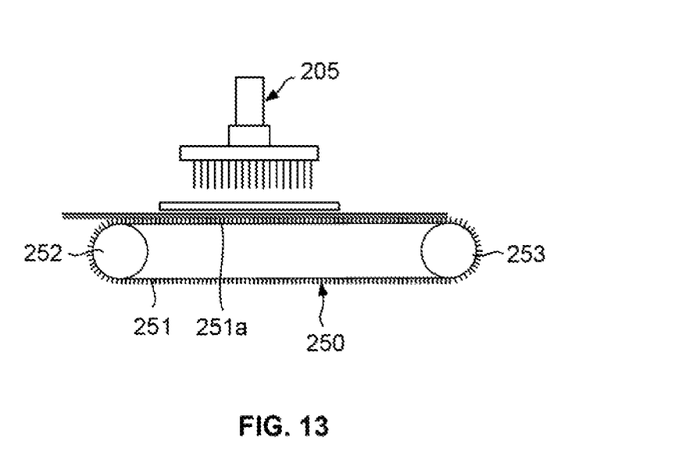
FIG. 13 is a partial enlarged view of FIG. 12.

FIGS. 12 and 13 illustrate an alternative embodiment of a laying up and needling system 208, in which the preform is laid on the upper strand of a first belt conveyor 280, transferred to a second belt conveyor 284 for the application of the felt, then transferred to the support table of the needling device 205 which is here formed by the upper strand of a third belt conveyor 250, which ensures the progression of the preform during needling. The first conveyor 280 comprises an endless band 281 mounted between an upstream roller and a downstream roller, at least one of which is motorized. The upper strand 281a of the band rests on the laying up plate 2 and the preform is laid up on the upper strand, preferably when the band is stopped. After the laying up of the preform, the conveyor is activated to transfer the preform to the upper strand 285a of the band 285 of the second conveyor 284, the band being mounted between an upstream roller and a downstream roller. The felt of non-woven filaments is applied to the upper face of the preform, according to the advance of the preform over the second conveyor, and the preform equipped with the felt is transferred to the upper strand of the third conveyor for the needling operation. The band 251 of this third conveyor is also mounted between an upstream roller 252 and a downstream roller 253. The third conveyor is a brush conveyor, in which the band has a plurality of bristles on which the preform rests, and in which the needles penetrate during needling, over a depth of penetration, defined for example between 2 and 10 mm.

Figure 14:
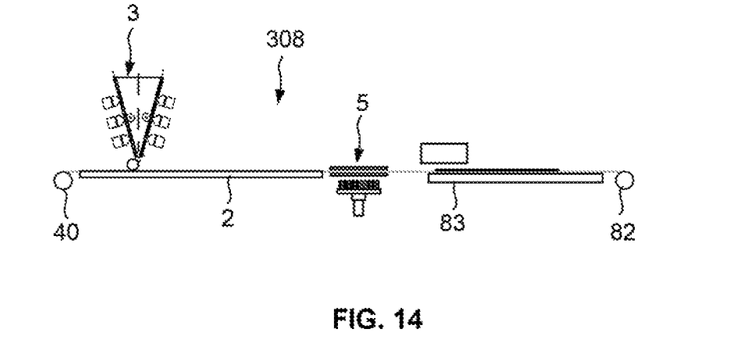
FIG. 14 is a schematic side view of a laying up and needling system according to a third embodiment; and, FIGS. 15 and 16 are respectively a top view and a side view of a needling device according to an alternative embodiment.

FIG. 14 illustrates another system 308 according to embodiments of the invention in which the preform is laid up over the nonwoven felt filament, the felt being used for transferring the preform from the laying up device 3 to the needling device 5, as well as for the progression of the preform during needling. The felt unwound from a bobbin 40 passes over the laying up plate 2, between the support table and the stripper plate of the needling device, then on a cutting plate 83, and is re-wound on a downstream roller 382. With respect to a previous embodiment, the needling device is in an inverted position, so that the needle board is arranged on the side of the preform equipped with the felt. The felt is advantageously an oriented felt, said felt being arranged so that the principal orientation filaments are arranged in the direction of the progression of the felt in order that said felt has a good mechanical strength ensuring the support and transfer of the preform from one station to another.

Figure 15:
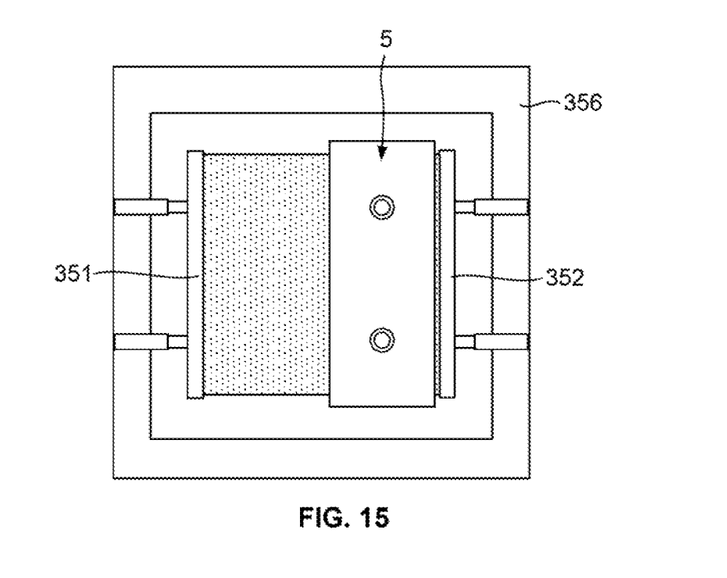
Figure 16:
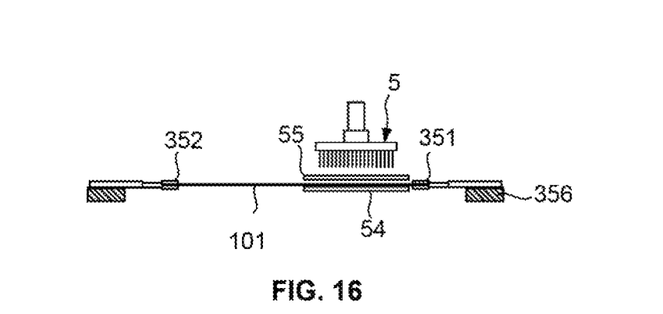

FIGS. 15 and 16 illustrate a variant of the embodiment in which the preform equipped with the felt is mounted on a frame 305 by means of clamps, the needling operation being carried out by translational movement of the frame relative to a needling device 5 by appropriate means. During needling, the preform is for example held between an upstream clamp 351 and a downstream clamp 352, and is positioned between the stripper plate and the support table of the needling device.

Although embodiments of the invention have been described in connection with various particular embodiments, it is obvious that it is not limited thereto and that it includes all the technical equivalents of the means described as well as their combinations if they are within the scope of the invention.

The invention claimed is:

1. A method for producing a composite material part comprising unidirectional continuous fibers and a polymer matrix, said method comprising the steps of:
    producing an initial dry preform, formed from unidirectional continuous dry fibers;
    applying a non-woven felt comprising non-woven filaments to a first main face of the initial dry perform, the non-woven felt having a surface mass of between 5 g/m² and 100 g/m² and the non-woven filaments having a diameter of between 5 μm and 50 μm;
    needling the non-woven filaments with a forked needling device comprising a plurality of forked needles, each forked needle provided with one notch, so that non-woven filaments are driven by the forked needles and arranged in a direction substantially perpendicular to the unidirectional continuous dry fibers of the initial dry preform so as to obtain a reinforced dry preform, each forked needle having a diameter of between 0.30 mm and 0.60 mm, the notch presenting a width and a depth of between 0.03 mm and 0.1 mm, the needling density being between 150 to 350 punches/cm²; and
    impregnating the reinforced dry preform with an impregnation polymer so as to obtain a composite material part, the impregnation polymer constituting the polymer matrix of the composite material part.

2. The method according to claim 1, wherein the non-woven filaments are formed from a second polymer, the impregnation step being carried out at a temperature below a melting temperature of the second polymer.

3. The method according to claim 1, wherein the non-woven filaments applied to the initial dry preform are of a length of between 10 and 100 mm.

4. The method according to claim 1, the initial dry preform presenting a second main face and the needling is performed so that non-woven filaments driven by the needles extend beyond the second main face of the initial dry preform over a length of between 1 and 10 mm.

5. The method according to claim 1, wherein the impregnation step comprises injecting the impregnation polymer into the reinforced dry preform.

6. The method according to claim 1, wherein the initial dry perform producing step includes producing several superimposed plies, the plies being formed from unidirectional continuous dry fibers provided with a binder, the binder comprising a third polymer.

7. The method according to claim 6, wherein the production of the dry initial preform comprises the production of superimposed plies, by contact application, by means of an application roller, of unidirectional continuous fibers on a laying up tool, each ply being made by application of one or more bands in an orientation on the laying up tool or on bands of the preceding ply, each band being formed of one or several fibers.

8. The method according to claim 1, including a step of thermoforming the reinforced dry preform obtained after the needling step to obtain a three-dimensional preform.

9. The method according to claim 1, the initial dry preform presenting a second main face, the method including a step of applying nonwoven filaments to the second main face of the initial dry preform, and needling the nonwoven filaments present on the second main face.

10. The method according to claim 1, the notch presenting a width and a depth of between 0.04 mm and 0.06 mm.

11. The method according to claim 1, the non-woven filaments having a diameter of between 10 μm and 35 μm.

* * * * *